(12) United States Patent  
Curran et al.

(10) Patent No.: US 10,519,013 B2  
(45) Date of Patent: Dec. 31, 2019

(54) WINCH SYSTEM FOR AN AIRBORNE PAYLOAD CONTROL SYSTEM

(71) Applicant: Lockheed Martin Corporation, Bethesda, MD (US)

(72) Inventors: Matthew Curran, Los Osos, CA (US); Dustin E. Gamble, San Luis Obispo, CA (US); Gordon Jennings, San Luis Obispo, CA (US); Justin Neel, Santa Margarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 231 days.

(21) Appl. No.: 15/444,686

(22) Filed: Feb. 28, 2017

(65) Prior Publication Data

US 2018/0244509 A1     Aug. 30, 2018

(51) Int. Cl.
| | | |
|---|---|---|
| *B66D 1/48* | (2006.01) | |
| *B66D 1/74* | (2006.01) | |
| *B64D 1/08* | (2006.01) | |
| *B66D 1/12* | (2006.01) | |
| *B66D 1/36* | (2006.01) | |

(52) U.S. Cl.
CPC ............... *B66D 1/485* (2013.01); *B64D 1/08* (2013.01); *B66D 1/12* (2013.01); *B66D 1/36* (2013.01); *B66D 1/741* (2013.01); *B66D 2700/0108* (2013.01); *B66D 2700/0141* (2013.01)

(58) Field of Classification Search
CPC ... B66D 1/12; B66D 1/36; B66D 1/50; B66D 1/741; B66D 2700/0108; B66D 2700/0141; B64F 1/08
See application file for complete search history.

(56) References Cited

U.S. PATENT DOCUMENTS

| | | |
|---|---|---|
| 2,295,537 A | 5/1940 | Anderson |
| 2,991,959 A * | 7/1961 | Rizzo ........................ B64F 1/08 244/3 |
| 3,389,880 A | 6/1968 | Ferguson |

(Continued)

FOREIGN PATENT DOCUMENTS

| | | | |
|---|---|---|---|
| EP | 0571207 A1 | 11/1993 | |
| EP | 3366636 A1 * | 8/2018 | ............. B66D 1/741 |

(Continued)

OTHER PUBLICATIONS

Dean Sigler, "A Matter of Great Faith," CAFE Foundation Blog, http://cafe.foundation/blog/a-matter-of-great-faith/, Mar. 20, 2011.

(Continued)

*Primary Examiner* — Emmanuel M Marcelo  
(74) *Attorney, Agent, or Firm* — Baker Botts L.L.P.

(57) ABSTRACT

A method for a winch system includes receiving, from a controller, instructions to spool a payload line, the payload line comprising a first end and a second end, the first end coupled to a main reel of the winch system and the second end configured to couple to a payload. The method further includes operating, based on the instructions, one or more of a first motor of the winch system and a second motor of the winch system, wherein the one or more of the first motor and the second motor are operated in order to control a position of the second end of the payload line.

20 Claims, 3 Drawing Sheets

(56) References Cited

U.S. PATENT DOCUMENTS

| | | | |
|---|---|---|---|
| 3,466,013 A * | 9/1969 | Smith, Jr. | B66D 1/50 |
| | | | 226/177 |
| 4,416,436 A | 11/1983 | Wilson, Jr. | |
| 4,730,194 A | 3/1988 | Tharp | |
| 6,824,102 B2 | 11/2004 | Haggard | |
| 8,231,083 B2 | 7/2012 | Kutzmann et al. | |
| 8,720,811 B2 * | 5/2014 | Zink | B65H 75/38 |
| | | | 242/397 |
| 8,857,754 B2 | 10/2014 | Ferrari et al. | |
| 8,973,860 B2 | 3/2015 | Beard | |
| 9,346,547 B2 | 5/2016 | Patrick et al. | |
| 9,359,075 B1 | 6/2016 | von Flotow et al. | |
| 10,384,782 B2 * | 8/2019 | Curran | B64D 1/22 |
| 2003/0107029 A1 * | 6/2003 | Hanson | B66D 1/12 |
| | | | 254/362 |
| 2005/0230671 A1 * | 10/2005 | Mott | B66D 1/38 |
| | | | 254/385 |
| 2012/0048996 A1 | 3/2012 | Wilson et al. | |
| 2015/0175277 A1 * | 6/2015 | Hachtmann | B64F 3/00 |
| | | | 244/153 R |
| 2016/0059963 A1 | 3/2016 | Burgess et al. | |
| 2017/0362067 A1 * | 12/2017 | Hiekata | B66D 1/12 |

FOREIGN PATENT DOCUMENTS

| | | |
|---|---|---|
| GB | 2 434 352 A | 7/2007 |
| JP | H04 53790 U | 5/1992 |

OTHER PUBLICATIONS

Extended Search Report in European Patent Application No. 18158 341.0-1017, dated Jul. 20, 2018, 15 pages.

European Examination Report in Application No. 18 158 341.0-1017, dated Jul. 15, 2019, 5 pages.

* cited by examiner

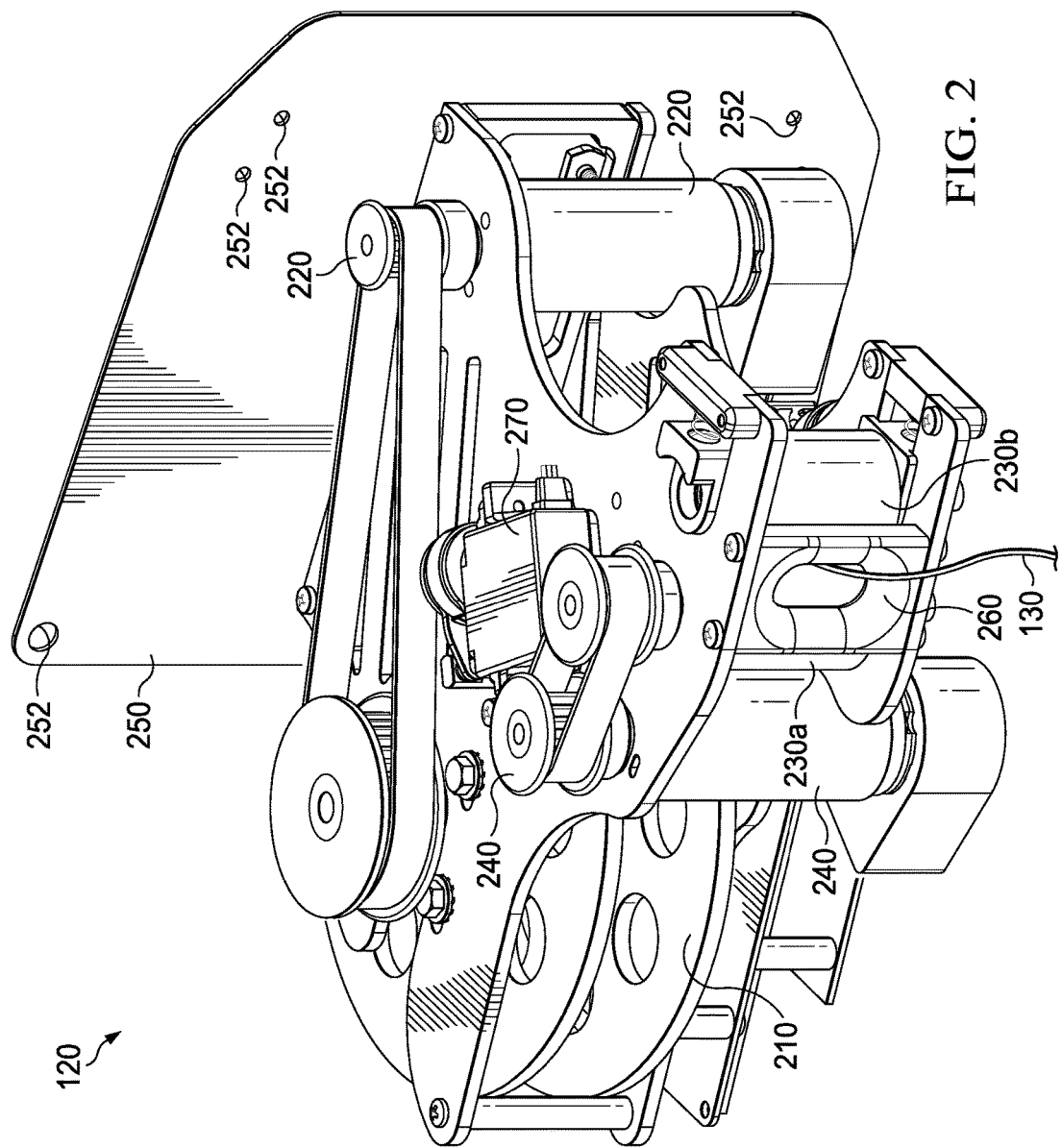

WINCH SYSTEM FOR AN AIRBORNE PAYLOAD CONTROL SYSTEM

TECHNICAL FIELD

This disclosure relates in general to payload control and more particularly to a winch system for an airborne payload control system.

BACKGROUND

The ability for a moving aircraft to control the position of a payload in space may enable a variety of missions. As an example, such an ability would enable a moving aircraft to retrieve a stationary or mobile payload. As another example, such an ability would enable a moving aircraft to carefully place a fragile object on the ground. As yet another example, such an ability would enable a moving aircraft to hold a sensor above the ground while the aircraft is beyond visual and acoustical detection range.

SUMMARY OF THE DISCLOSURE

According to one embodiment, a method for a winch system includes receiving, from a controller, instructions to spool a payload line, the payload line comprising a first end and a second end, the first end coupled to a main reel of the winch system and the second end configured to couple to a payload. The method further includes operating, based on the instructions, one or more of a first motor of the winch system and a second motor of the winch system, wherein the one or more of the first motor and the second motor are operated in order to control a position of the second end of the payload line.

Technical advantages of certain embodiments may include controlling the position of a payload during the flight of a fixed-wing aircraft. Additionally, certain embodiments may provide controlled retrieval or release of a stationary or mobile payload. Furthermore, certain embodiments may provide inconspicuous data retrieval. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 2 illustrates a perspective view of an example winch system of the airborne payload control system of FIG. 1, according to certain embodiments;

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 6, where like numbers are used to indicate like and corresponding parts.

This disclosure recognizes using an integrated systems approach to payload release and retrieval. Such approach may permit fixed-wing aircraft to exert helicopter-like control over a payload line. The approach may also permit autonomous unmanned aircraft to hold a payload stationary during flight. Integrating multiple systems for payload release and retrieval as described herein may permit the airborne payload control system to stabilize and control the end of a payload line in both position and altitude.

Figure 1:
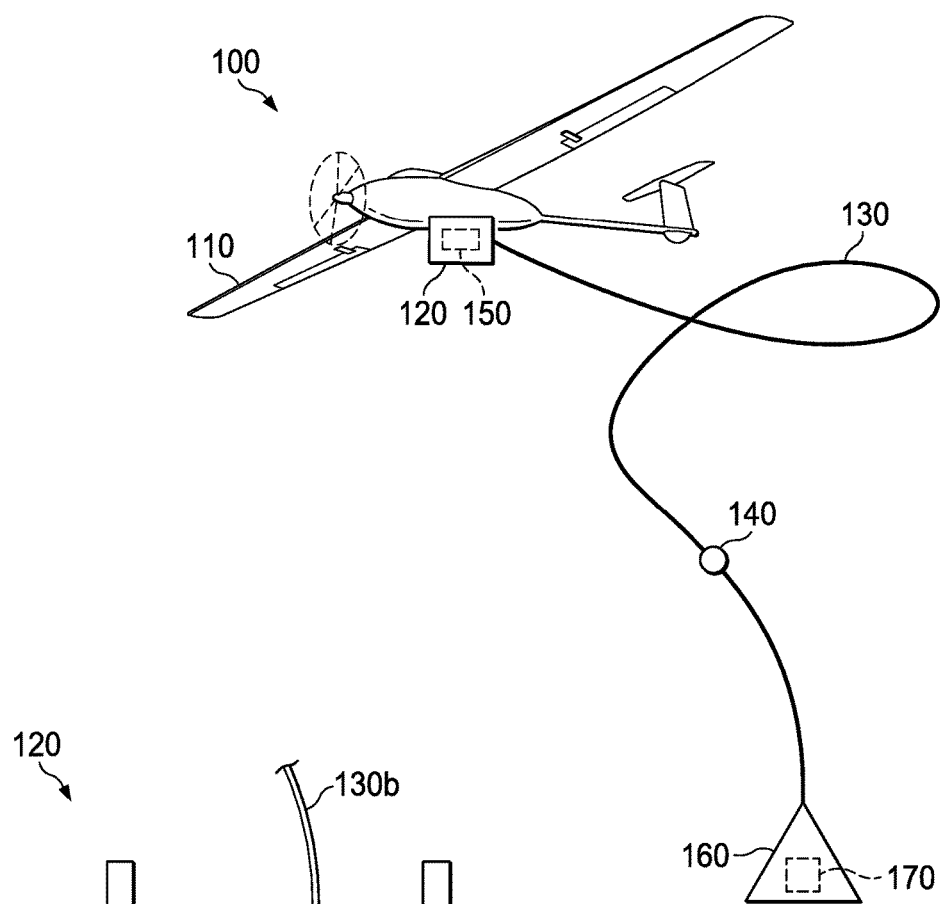
FIG. 1 illustrates an airborne payload control system, according to certain embodiments.

FIG. 1 illustrates an airborne payload control system 100 operable to maintain the position and altitude of the end of a payload line. Airborne payload control system 100 may, in some embodiments, comprise an aircraft 110, a winch system 120, a payload line 130, a line sensor 140, and one or more controllers 150. One or more components of airborne payload control system 100 may be communicably coupled to ensure control over payload line 130, which may then be used to release, retrieve, and/or transport payload 160.

Aircraft 110 may be any vehicle operable to fly in the air. In some embodiments, aircraft 110 is an unmanned aerial vehicle ("UAV") that does not require manned operation of aircraft 110. Aircraft 110 may also be any fixed-wing aircraft such as an airplane. This disclosure recognizes that aircraft 110 may, in some embodiments, transport payload 160. In some embodiments, payload 160 is transported within a fuselage of aircraft 110. In other embodiments, payload 160 may be transported via payload line 140. As an example, payload 160 may be coupled to an end of payload line 130 and may be reeled into or out of aircraft 110.

Aircraft 110 may comprise an onboard avionics system. In some embodiments, features of the onboard avionic system may be controlled by one or more controllers (e.g., controller 150 of FIG. 1). For example, in response to receiving instructions from controller 150, the onboard avionic system may adjust or maintain one or more of the flight path, speed, orbit, and/or altitude of aircraft 110. In some embodiments, controller 150 instructs the onboard avionics system to adjust or maintain one or more of the flight path, speed, orbit, and/or altitude of aircraft 110 in order to control a position and/or altitude of the end of payload line 130. By controlling the position and/or altitude of the end of payload line 130, the position and/or altitude of payload 160 may be controlled.

Maintaining control over payload 160 may enable various missions such as the controlled retrieval of a stationary or mobile payload. As another example, maintaining control over payload 160 may enable controlled release of payloads (e.g., careful placement of fragile payloads on the ground). As yet another example, maintaining control over payload 160 may enable inconspicuous data retrieval (e.g., holding a payload such as a sensor or camera above the ground while the aircraft flies at an altitude that is visually and acoustically undetectable).

As described above, airborne payload control system 100 may also include winch system 120 and payload line 130. Winch system 120 may, in some embodiments, be located aboard aircraft 110 (e.g., in fuselage of aircraft 110). In other embodiments, winch system 120 is coupled to an exterior wall of aircraft 110. For example, as depicted in FIG. 1, winch system 120 is coupled to the underside of aircraft 110. Winch system 120 may be operable to spool payload line 130. Accordingly, winch system 120 is the component of airborne payload control system 100 that is responsible for reeling in and reeling out payload line 130. In some embodiments, a first end 130a of payload line 130 is coupled to winch system 120 and a second end 130b of payload line 130 is not coupled to winch system 120. As an example, first end 130a of payload line 130 may be secured to main reel 210 and second end 130b of payload line 130 may initially be wound about main reel 210 and thereafter be reeled towards or away from aircraft 110. Additional details of winch system 120 are described below in reference to FIG. 2.

Second end 130b of payload line 130 may be operable to couple to payload 160. In some embodiments, payload 160 is coupled to second end 130b of payload line 130 using a coupling mechanism (not depicted). In some embodiments, coupling mechanism is a magnet, a hook, or a suction cup. Although this disclosure describes particular types of coupling mechanisms, this disclosure recognizes any suitable coupling mechanism operable to couple payload 160. In other embodiments, payload 160 is coupled to second end 130b of payload line 130 without the aid of an additional component. As an example, second end 130b of payload line 130 may be configured to couple to a moving payload 160 such as the weight-shifting coaxial helicopter described in U.S. application Ser. No. 15/085,540 and incorporated by reference herein. In such an example, the weight-shifting coaxial helicopter may fly into or near the second end 130b of payload line 130, causing payload line 130 to get tangled on or between the blades of weight-shifting coaxial helicopter. As a result, the weight-shifting coaxial helicopter is secured or otherwise coupled to second end 130b of payload line 130.

Payload line 130 may comprise any suitable material. For example, payload line 130 may comprise monofilament or braided, synthetic or non-synthetic rope, string, twine, or fishing line. Preferably, payload line 130 comprises a material that has the desired tensile strength, diameter, drag, and shape memory.

Airborne payload control system 100 may also include line sensor 140 as described above. In some embodiments, line sensor 140 is positioned on payload line 130. Line sensor 140 may be operable to detect information about payload line 130. For example, line sensor 140 may be operable to detect information about one or more of a position of the payload line (e.g., a position in space of second end 130b of payload line 130), a velocity of the payload line (e.g., a velocity of second end 130b of payload line 130), and an altitude of second end 130b of payload line 130. Although this disclosure describes certain types of information that may be detected by line sensor 140, this disclosure recognizes that line sensor 140 may detect any suitable information. As used herein, suitable information that may be detected by line sensor 140 includes any information that may be utilized by one or more controllers 150 of airborne payload system 150. In some embodiments, the information detected by line sensor 140 is relayed to other components of airborne payload control system 100 (e.g., via RF signal). As an example, the information detected by line sensor 140 may be sent to one or more controllers 150 of airborne payload control system 100. In some embodiments, controllers 150 may provide instructions to aircraft 110 and/or winch system 120 based on the information detected by line sensor 140. For example, in response to line sensor 140 detecting that the velocity of second end 130b of payload line 130 is increasing in a downward direction, one or more controllers 150 of airborne payload system 100 may instruct winch system 120 to reel in payload line 130 at a rate of speed to correct the downward motion. As another example, in response to line sensor 140 detecting that the altitude of second line 130b of payload line 130 is decreasing, one or more controllers 150 of airborne payload system 100 may instruct aircraft 110 to increase the altitude of aircraft 110 to maintain the desired altitude of second end 130b of payload line 130.

Line sensor 140 may detect information about payload line 130 continuously or periodically. For example, line sensor 140 may continuously detect information about payload line 130 and make such real-time information available to one or more components of airborne payload control system 100. As another example, line sensor 140 may detect information about payload line 130 periodically (e.g., every one second). In a preferred embodiment, line sensor 140 detects and relays real-time information. This disclosure recognizes that control over payload line 130 and/or payload 160 is more precise when real-time information is detected as compared to using periodic information.

In some embodiments, line sensor 140 is under the direction and/or control of controller 150. For example, controller 150 may control the operation of line sensor 140. In such an embodiment, controller 150 may instruct line sensor 140 when to begin detecting information about payload line 130. As an example, controller 150 may instruct line sensor 140 to begin detecting information about payload line 130 when payload 160 is a particular distance from aircraft 110. Controller 150 may also instruct line sensor when, or with what component, to share the detected information. As an example, controller 150 may instruct line sensor 140 to continuously share real-time information with a data link associated with winch system 120.

Airborne payload control system 100 may also include one or more controllers 150 as described above. As illustrated in FIG. 1, airborne payload control system 100 includes a single controller 150. This disclosure recognizes that one or more components of airborne payload control system 100 may include a controller 150. As an example, aircraft 110 may be associated with a first controller 150 and winch system 120 may be associated with a second controller 150. In such an example, the first controller 150 and the second controller 150 may be configured to receive data from one or more other components of airborne payload control system 100. For example, the first controller 150 and the second controller 150 may receive information about payload line 130 from line sensor 140 and may receive information about payload 160 from tracking and control system 170. In some embodiments, the one or more controllers 150 may be configured to exchange information with one another (e.g., the first controller relays information about the aircraft's position, flight path, speed, orbit, and altitude to the second controller). In other embodiments, aircraft 110 and/or winch system 120 may be associated with a data link which is configured to share data with the one or more controllers 150.

In some embodiments, controller 150 includes or is a computer system such as computer system 600 described below in reference to FIG. 6. Controller 150 may be operable to receive information from one or more of line sensor 140 and tracking and control system 170 and provide operation instructions to one or more of aircraft 110 and winch system 120. In some embodiments, the one or more controllers 150 are configured to analyze the received information and compute various factors that may stabilize the second end 130*b* of payload line 130. For example, controllers 150 may compute factors such as optimal headings, flight paths, flight speeds, reel speeds, reel directions, payload line lengths, and payload line tensions. In some embodiments, the logic used to compute such factors is stored in a memory of controller 150 (e.g., memory 620 of FIG. 6).

Airborne payload control system 100 may also include other components such as a tracking and control system 170 for payload 160. The tracking and control system 170 of payload 160 may be configured to sense information about the position or location of payload 160 and relay the sensed information to other components of airborne payload control system 100. As an example, tracking and control system 170 may send information about the location and position of payload 160 to controllers 150 of airborne payload control system 100. Airborne payload control system 100 may in turn use this information to instruct aircraft 110 and/or winch system 120. Although this disclosure describes and depicts airborne payload control system 100 including certain components, airborne payload control system 100 may include any suitable components. For example, this disclosure recognizes that airborne payload control system 100 may include components and features that may be used in conjunction with tracking, control, and transport of payloads.

In operation, winch system 120, under direction from controller 150, may reel payload line 130 out in anticipation of retrieving or releasing payload 160. As an example, winch system 120 may begin reeling out payload line 130 in response to receiving an instruction from controller 150 to increase the length of payload line 150 by 300 feet. In some embodiments, controller 150 sends such instruction to winch system 120 after determining that a payload 160 requiring pick-up is one mile away. This determination may be based on information received from tracking and control system 170 of payload 160. After winch system 120 reels out payload line 130 in accordance with the instructions from controller 150, controller 150 may begin receiving data from line sensor 140 about payload line 130. As an example, controller 150 may receive the following information from line sensor: 3D velocity components (e.g., Vnorth, Veast, Vdown) and 3D position components (e.g., latitude, longitude, altitude). In addition receiving information from line sensor 140, controller 150 may also receive, or continue to receive, information from tracking and control system 170 of payload 170. For example, controller 150 may receive the following information from tracking and control system 170: 3D velocity components (e.g., Vnorth, Veast, Vdown) and 3D position components (e.g., latitude, longitude, altitude). Controller 150 may use the received information to provide operation instructions to one or more of aircraft 110 and winch system 120. As an example, based on the information received by controller 150, controller 150 may instruct winch system to adjust the length of payload line 130. As another example, controller 150 may instruct aircraft 110 to adjust the flight path of aircraft 110. In some embodiments, controller 150 facilitates the operation of aircraft 110 by providing instructions to the onboard avionics system. In some embodiments, controller 150 facilitates the operation of winch system 120 by providing instructions to one or more components of winch system 120 (e.g., first motor 220, second motor 240, etc.). Controller 150 may use the real-time information received from one or more of line sensor 140 and tracking and control system 170 to compute various factors such as optimal headings, flight paths, flight speeds, reel speeds, reel directions, payload line lengths, and payload line tension. Controller 170 may then instruct one or more of aircraft 110 and winch system 120 to make operational adjustments based on the computations. For example, controller 150 may instruct aircraft 110 to change its flight path based on computations. As another example, controller 150 may instruct winch system 120 to increase tension on payload line 130 based on the computations. In some embodiments, implementing the instructions of controller 150 stabilizes the second end 130*a* of payload line 130. For example, implementing the instructions of controller 150 may permit the second end 130*a* of payload line 130 to maintain a particular altitude (e.g., 1000 feet MSL) and a particular position (e.g., Latitude 35.3 degrees north, Longitude 120.8 degrees west) as aircraft 110 continues to fly through the air.

Figure 3:
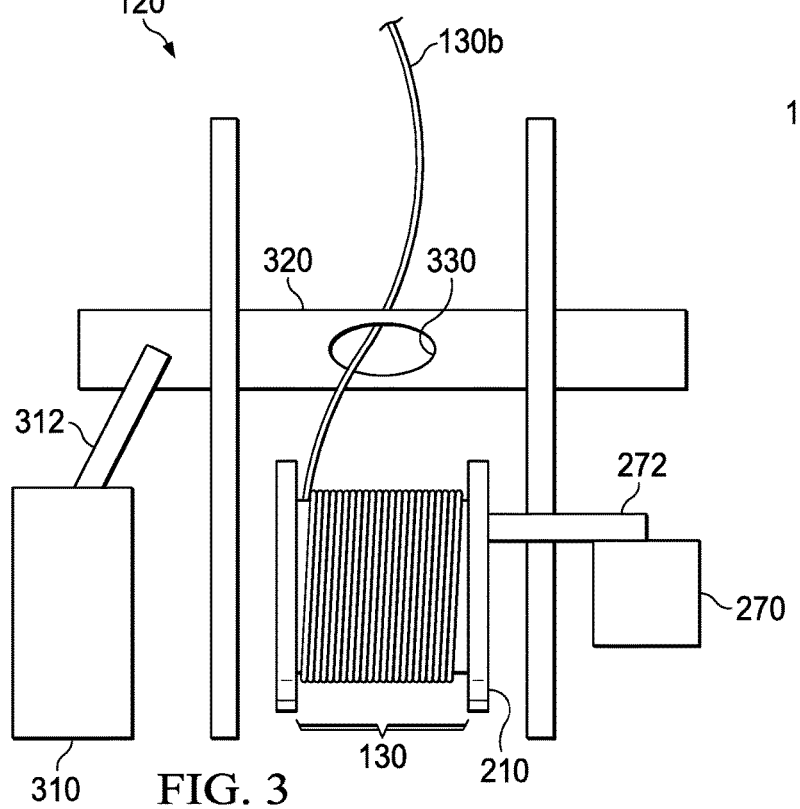
FIG. 3 illustrates a rear view of the example winch system of FIG. 2.

Turning now to FIG. 2, winch system 120 may comprise a main reel 210, a first motor 220, a set of pinch rollers 230 (i.e., 230*a*-*b*), and a second motor 240. As described above, winch system 120 is the component responsible for reeling payload line 130 in and out. As used herein, reeling payload line 130 out refers to increasing the length of payload line 130 extending from aircraft 110, and reeling payload line 130 in refers to decreasing the length of payload line 130 extending from aircraft 110. Main reel 210 may be a spool about which payload line 130 is wound. As described above, payload line 130 may be coupled to main reel 210 at a first end 130*a* and all or a portion of payload line 130 may be wound about main reel 210. Second end 130*b* of payload line 130 may be configured to be spooled onto and off of main reel 210. This is best illustrated in FIG. 3 wherein payload line 130 is wound about main reel 110 and second end 130*b* of payload line 130 is threaded through an aperture 330 in shaft 320.

In some embodiments, payload line 130 is spooled onto and off of main reel 210 by turning main reel 210. For example, turning main reel 210 in a first direction may feed payload line 130 out and turning main reel 210 in a second direction may reel payload line 130 in. In some embodiments, first motor 220 is operable to turn main reel 210 in both the first and the second direction. First motor 220 may receive instructions to turn main reel 210 from one or more controllers of airborne payload control system 100. As an example, controller 150 of FIG. 1 may send instructions to first motor 220 to turn main reel 210 in the first direction and, in response, first motor 220 may turn main reel 210 in the first direction.

As described above, winch system 120 may include pinch rollers 230. In some embodiments, payload line 130 may be threaded between first pinch roller 230*a* and second pinch roller 230*b*. Pinch rollers 230 may be configured to maintain tension on payload line 130. In some embodiments, tension on payload line 130 is maintained by keeping payload line taught between main reel 210 and pinch rollers 230. This may be achieved by turning pinch rollers 230 in the first and/or second direction. In some embodiments, one or more pinch rollers 230 are rotated by second motor 240.

Second motor 240 may be configured to turn one or more pinch rollers 230. For example, second motor 240 may be configured to turn first pinch roller 230*a* but not second pinch roller 230*b*. Second motor 240 may be configured to turn one or more pinch rollers 230 in the first direction and/or the second direction. In some embodiments, second motor 240 receives instructions from one or more controllers of airborne payload control system 100. For example, controller 150 of FIG. 1 may send instructions to second motor 240 to turn first pinch roller 230a in the first direction and, in response, second motor 240 may turn first pinch roller 230a in the first direction.

In some embodiments, one or more controllers of airborne payload control system 100 may send instructions to one or more of first motor 220 and second motor 240. For example, in response to determining to feed payload line 130 out, controller 150 of FIG. 1 may instruct second motor 240 to turn one or more pinch rollers 230 in the first direction (to feed payload line 130 out). As another example, in response to determining to feed payload line 130 in, controller 150 of FIG. 1 may instruct first motor 230 to turn main reel 210 in the second direction (to reel payload line 130 in). In addition to instructing motors 220 and 240 regarding directions of turning, controller(s) 150 may instruct motors 220 and 240 to turn main reel 210 and pinch rollers 230, respectively, at particular rates. In some embodiments, such instructions may enable controller 150 to control the speed and/or length of payload line 130 and/or tension on payload line 130.

Controller(s) 150 may send instructions to first motor 220 and second motor 240 that enable main reel 210 and pinch rollers 230 to cooperate to feed payload line 130 in and out. For example, in response to determining to feed payload line 130 in, controller 150 of FIG. 1 may instruct first motor 230 to turn main reel 210 in the second direction and instruct second motor 220 to apply a braking function. As another example, in response to determining to feed payload line 130 out, controller 150 of FIG. 1 may instruct second motor 240 to turn one or more pinch rollers 230 in the second direction and instruct first motor 220 to apply a braking function. Such instructions may permit payload line 130 to be reeled in and out while also keeping payload line 130 taught between main reel 210 and pinch roller 230 thus preventing payload line 130 from tangling (e.g., as may occur when reeling in payload line 130 at high speeds and not keeping payload line 130 taught). In some embodiments, the instructions of controller(s) 150 to first motor 220 and/or second motor 240 may permit winch system 120 to maintain second end 130b of payload line 130 in a particular position (e.g., latitude, longitude, and altitude).

Each of motors 220 and 240 may be associated with one or more optical encoders (not illustrated). The one or more optical encoders may be configured to detect information about payload line 130 and relay the information to one or more controllers of airborne payload control system 100 (e.g., controller 150). As an example, the information detected by an optical encoder may be used to determine the length of payload line 130 on main reel 210. Such information may in turn be used by controller 150 to provide instructions to one or more components of airborne payload control system 100 (e.g., first motor 220, second motor 240, etc.). For example, in response to determining, based on information from an optical encoder associated with first motor 220, that payload line 130 on main reel 210 is nearly empty, controller 150 sends instructions to reduce the speed of second motor 240 while reeling out payload line 130.

As described above, instructions from controller(s) 150 may be based on information received from line sensor 140. For example, in response to receiving information from line sensor 140, controller 150 may send instructions to one or more of first motor 220 and second motor 240. In this manner, controller(s) 150 may use feedback from line sensor 140 to control the distance, velocity, acceleration, and/or jerk on payload line 130. In some embodiments, the distance, velocity, acceleration, and/or jerk of payload line 130 is controlled to maintain a particular position (e.g., latitude, longitude, and altitude) of second end 130b of payload line 130 during the flight of aircraft 110.

In some embodiments, winch system 120 includes additional components. For example, as illustrated in FIG. 2, winch system 120 includes a mounting plate 250. Mounting plate 250 may be configured to mount winch system 120 to aircraft 110. In some embodiments, mounting plate 250 includes apertures 252 configured to receive fasteners therethrough. Fasteners may be used to couple winch system 120 to aircraft 110. Winch system 120 may also include an eye 260. In some embodiments, eye 260 is a plate comprising an aperture through which second end 130b of payload line 130 is threaded. Eye 260 may be configured to restrict movement of payload line 130. This may be desirable to limit movement of payload line 130 as it is reeled in and out by winch system 120.

Winch system 120 may also include one or more servo motors (e.g., servo motors 270 and 310) that provide additional functionality. Servo motors 270 and 310 and the functionality they provide are best illustrated in FIG. 3. Servo motor 270 may be operable to move a locking bar 272 from a first position to a second position. In some embodiments, main reel 210 may be turned in the first or the second direction when locking bar 272 is in the first position (unlocked position) and main reel 210 may be prevented from turning when locking bar 272 is in the second position (locked position). In some embodiments, servo motor 270 is configured to receive instructions from one or more controllers of airborne payload control system 100 (e.g., controller 150 of FIG. 1) and move locking bar 272 from the first position to the second position (or from the second position to the first position) upon receiving instructions to do so. As an example, upon receiving instructions from controller 150 to move locking bar 272 into the second position, servo motor 170 may push locking bar 272 into main reel 210, thereby preventing main reel 210 from turning.

FIG. 3 also illustrates servo motor 310. Servo motor 310 may be operable to move shaft 320. As an example, servo motor 310 may be operable to move shaft 320 from a first position to a second position. As described above, shaft 320 may include aperture 330 through which second end 130b of payload line 130 is threaded. In some embodiments, moving shaft 320 from the first position to the second position causes payload line 130 to be distributed in a substantially even manner on main reel 210. As used herein, distributing payload line 130 in a "substantially even manner" prevents payload line 130 from being lumped on the sides or in the center of main reel 210. This disclosure recognizes certain benefits of distributing payload line 130 in a substantially even manner across main reel 210. For example, such distribution may reduce the likelihood of tangles, catches, and/or snags. Although this disclosure describes and depicts winch system 120 comprising particular components, this disclosure recognizes that winch system 120 may comprise any suitable component.

This disclosure also contemplates a line cutting feature of winch system 120. In some embodiments, this line cutting feature is performed using components described herein. Such feature may be performed at the direction of controller(s) 150. For example, controller 150 may instruct servo motor 170 to move locking bar 272 into the locked position and, after locking bar 272 is positioned in the locked position, instruct second motor 240 to begin feeding line out, thus causing a friction cut of payload line 130.

Figure 4:
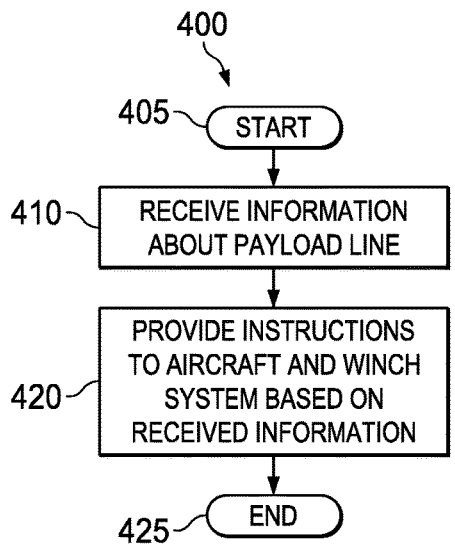
FIG. 4 illustrates a method of operation for the airborne payload control system of FIG. 1.

FIG. 4 illustrates a method 400 of operation for airborne payload control system 100. Method 400 may be performed by one or more controllers of airborne payload control system 100. As an example, controller 150 of FIG. 1 may perform method 400. As described above, a controller operable to perform method 400 may be a computer such as computer 600 of FIG. 6. Method 400 may be stored in a memory of controller (e.g., memory 620 of FIG. 6).

Method 400 may begin in step 405 and proceed to step 410. At step 410, controller 150 may receive information about payload line 130. As described above, controller 150 may receive information about payload line 130 from line sensor 140. The information received by controller 150 may comprise one or more of: a position of payload line 130; a velocity of payload line 130; and an altitude of second end 130b of the payload line 130. Although this disclosure recognizes particular types of information that may be sensed by line sensor 140, this disclosure recognizes that line sensor 140 may detect any suitable information (e.g., information that would be helpful in maintaining a position of second end 130b of payload line 130). In some embodiments, after receiving information about payload line 130, method 400 proceeds to step 420.

At step 420, controller 150 provides instructions to aircraft 110 and winch system 120 based on information received at step 410. In some embodiments, the instructions provided by controller 150 at step 420 cause a position of second end 130b of payload line 130 to be maintained. As described above, controller 150 may provide instructions to an onboard avionic system operable to control one or more of the flight path, speed, orbit, and/or altitude of aircraft 110. Controller 150 may also provide instructions to one or more of first motor 220 and/or second motor 240. As described above, instructions to first motor 220 may include instructions regarding one or more of a direction of turning main reel 210, a speed at which to turn main reel 210, a tension on payload line 130, and an application of a braking functionality. Instructions to second motor 220 may include instructions regarding one or more of a direction of turning one or more pinch rollers 130, a speed of turning one or more pinch rollers 130, a tension on payload line 130, and an application of a braking functionality. Controller 150 may also provide instructions to one or more servo motors of winch system 120. For example, controller 150 may instruct servo motor 270 to move locking bar 272 from a first position to a second position. As another example, controller 150 may instruct servo motor 310 to move shaft 320 from a first position to a second position. In some embodiments, after performing step 420, method 400 proceeds to an end step 425.

Figure 5:
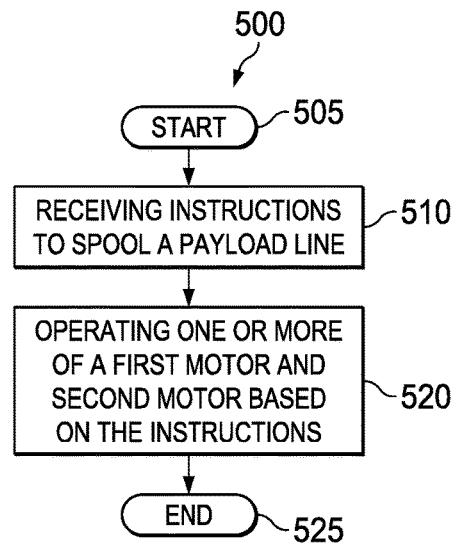
FIG. 5 illustrates a method of operation for the winch system of FIG. 2.

FIG. 5 illustrates a method 500 of operation for winch system 120. Method 500 may be performed by one or more controllers of airborne payload control system 100. As an example, controller 150 of FIG. 1 may perform method 500. As described above, a controller operable to perform method 500 may be a computer such as computer 600 of FIG. 6. Method 500 may be stored in a memory of controller (e.g., memory 620 of FIG. 6).

Method 500 may begin in step 505 and proceed to step 510. At step 510, one or more of first motor 220 and second motor 240 receives instructions to spool payload line 130. In some embodiments, the received instructions instruct first motor 220 and/or second motor 240 to spool payload line 130 in or out. As described above, payload line 130 may be spooled out by turning one or more of main reel 210 and/or pinch rollers 130 in the first direction and payload line 130 may be spooled in by turning one or more of main reel 210 and/or pinch rollers 130 in the second direction.

In some embodiments, payload line 130 is spooled out by instructing first motor 220 to perform a braking function and instructing second motor 240 to turn in the first direction. In some other embodiments, payload line 130 is spooled in by instructing first motor 220 to turn in the second direction and instructing second motor 240 to apply a braking function. In some embodiments, the received instructions instruct first motor 220 and/or second motor 240 to operate at a particular speed. In other embodiments, the received instructions instruct first motor 220 and/or second motor 240 to pull payload line 130 taught. Although this disclosure describes particular types of instructions that may be received from one or more controllers of airborne payload control system 100, this disclosure recognizes that the received instructions may include any suitable information that may enable winch system 120 to control the position of second end 130b of payload line 130. In some embodiments, after first motor 220 and/or second motor 240 receives instructions to spool payload line 130, the method 500 proceeds to step 520.

At step 520, first motor 220 and/or second motor 240 operate based on the instructions received at step 510. For example, first motor 220 may apply a braking function in response to receiving an instruction to perform a braking function. As another example, second motor 240 may begin turning pinch roller 230a at a particular rate (e.g., 150 rpm) in the first direction in order to increase the length of payload line 130. The instructions may be implemented serially or simultaneously. In some embodiments, implementing the instructions received at step 510 cause the position of second end 130b of payload line 130 (e.g., latitude, longitude, and altitude) to be maintained.

Figure 6:
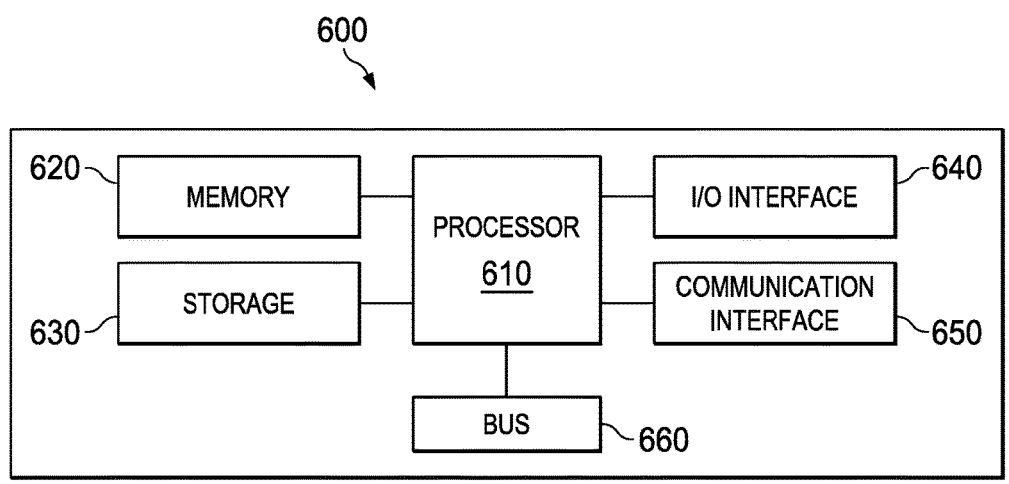
FIG. 6 illustrates an example computer system that may be included in a controller of the airborne payload control system of FIG. 1, according to certain embodiments.

FIG. 6 illustrates an example computer system 600. Computer system 600 may be utilized by airborne payload control system 100 of FIG. 1. For example, controller 150 of FIG. 1 may be a computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 610, memory 620, storage 630, an input/output (I/O) interface 640, a communication interface 650, and a bus 660. Although this disclosure describes and illustrates a particular computer system having a particular number of particular components in a particular arrangement, this disclosure contemplates any suitable computer system having any suitable number of any suitable components in any suitable arrangement.

In particular embodiments, processor 610 includes hardware for executing instructions, such as those making up a computer program. As an example and not by way of limitation, to execute instructions, processor 610 may retrieve (or fetch) the instructions from an internal register, an internal cache, memory 620, or storage 630; decode and execute them; and then write one or more results to an internal register, an internal cache, memory 620, or storage 630. In particular embodiments, processor 610 may include one or more internal caches for data, instructions, or addresses. This disclosure contemplates processor 610 including any suitable number of any suitable internal caches, where appropriate. As an example and not by way of limitation, processor 610 may include one or more instruction caches, one or more data caches, and one or more translation lookaside buffers (TLBs). Instructions in the instruction caches may be copies of instructions in memory 620 or storage 630, and the instruction caches may speed up retrieval of those instructions by processor 610. Data in the data caches may be copies of data in memory 620 or storage 630 for instructions executing at processor 610 to operate on; the results of previous instructions executed at processor 610 for access by subsequent instructions executing at processor 610 or for writing to memory 620 or storage 630; or other suitable data. The data caches may speed up read or write operations by processor 610. The TLBs may speed up virtual-address translation for processor 610. In particular embodiments, processor 610 may include one or more internal registers for data, instructions, or addresses. This disclosure contemplates processor 610 including any suitable number of any suitable internal registers, where appropriate. Where appropriate, processor 610 may include one or more arithmetic logic units (ALUs); be a multi-core processor; or include one or more processors 610. Although this disclosure describes and illustrates a particular processor, this disclosure contemplates any suitable processor.

In particular embodiments, memory 620 includes main memory for storing instructions for processor 610 to execute or data for processor 610 to operate on. As an example and not by way of limitation, computer system 600 may load instructions from storage 630 or another source (such as, for example, another computer system 600) to memory 620. Processor 610 may then load the instructions from memory 620 to an internal register or internal cache. To execute the instructions, processor 610 may retrieve the instructions from the internal register or internal cache and decode them. During or after execution of the instructions, processor 610 may write one or more results (which may be intermediate or final results) to the internal register or internal cache. Processor 610 may then write one or more of those results to memory 620. In particular embodiments, processor 610 executes only instructions in one or more internal registers or internal caches or in memory 620 (as opposed to storage 630 or elsewhere) and operates only on data in one or more internal registers or internal caches or in memory 620 (as opposed to storage 630 or elsewhere). One or more memory buses (which may each include an address bus and a data bus) may couple processor 610 to memory 620. Bus 660 may include one or more memory buses, as described below. In particular embodiments, one or more memory management units (MMUs) reside between processor 610 and memory 620 and facilitate accesses to memory 620 requested by processor 610. In particular embodiments, memory 620 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 620 may include one or more memories 620, where appropriate. Although this disclosure describes and illustrates particular memory, this disclosure contemplates any suitable memory.

In particular embodiments, storage 630 includes mass storage for data or instructions. As an example and not by way of limitation, storage 630 may include a hard disk drive (HDD), a floppy disk drive, flash memory, an optical disc, a magneto-optical disc, magnetic tape, or a Universal Serial Bus (USB) drive or a combination of two or more of these. Storage 630 may include removable or non-removable (or fixed) media, where appropriate. Storage 630 may be internal or external to computer system 600, where appropriate. In particular embodiments, storage 630 is non-volatile, solid-state memory. In particular embodiments, storage 630 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 630 taking any suitable physical form. Storage 630 may include one or more storage control units facilitating communication between processor 610 and storage 630, where appropriate. Where appropriate, storage 630 may include one or more storages 630. Although this disclosure describes and illustrates particular storage, this disclosure contemplates any suitable storage.

In particular embodiments, I/O interface 640 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 640 for them. Where appropriate, I/O interface 640 may include one or more device or software drivers enabling processor 610 to drive one or more of these I/O devices. I/O interface 640 may include one or more I/O interfaces 640, where appropriate. Although this disclosure describes and illustrates a particular I/O interface, this disclosure contemplates any suitable I/O interface.

In particular embodiments, communication interface 650 includes hardware, software, or both providing one or more interfaces for communication (such as, for example, packet-based communication) between computer system 600 and one or more other computer systems 600 or one or more networks. As an example and not by way of limitation, communication interface 650 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 650 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 650 for any of these networks, where appropriate. Communication interface 650 may include one or more communication interfaces 610, where appropriate. Although this disclosure describes and illustrates a particular communication interface, this disclosure contemplates any suitable communication interface.

In particular embodiments, bus 660 includes hardware, software, or both coupling components of computer system 600 to each other. As an example and not by way of limitation, bus 660 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 660 may include one or more buses 712, where appropriate. Although this disclosure describes and illustrates a particular bus, this disclosure contemplates any suitable bus or interconnect.

The components of computer system 600 may be integrated or separated. In some embodiments, components of computer system 600 may each be housed within a single chassis. The operations of computer system 600 may be performed by more, fewer, or other components. Additionally, operations of computer system 600 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A winch system for use in an aircraft, the winch system comprising:
 a payload line comprising a sensor, a first end and a second end, wherein:
  the second end is operable to couple to a payload; and
  the sensor is operable to detect information about the payload line and transmit the detected information to at least one controller;
 a main reel about which the payload line is wound;
 a first motor operable to turn the main reel in a first and a second direction in response to receiving instructions from the at least one controller, wherein turning the main reel in the first direction feeds the payload line out, and turning the wheel in the second direction reels the payload line in;
 a first pinch roller and a second pinch roller between which the payload line is threaded, wherein the first and the second pinch rollers are configured to maintain tension on the payload line; and
 a second motor operable to turn the first and the second pinch rollers in response to receiving instructions from the at least one controller, wherein turning the pinch rollers in the first direction feeds the payload line out, and turning the pinch rollers in the second direction reels the payload line in;

wherein:
the first and the second motors cooperate to feed out and reel in the payload line; and
one or more of the main reel or the first and the second pinch rollers is turned based on information detected by the sensor in order to control a position or the second end of the payload line when the aircraft is airborne.

2. The winch system of claim 1, wherein feeding the payload line out comprises:
the first motor applying a braking function; and
the second motor turning the pinch rollers in the first direction.

3. The winch system of claim 1, wherein reeling in the payload line in comprises:
the first motor turning the main reel in the second direction; and
the second motor applying a braking function.

4. The winch system of claim 1, further comprising the at least one controller, the at least one controller operable to provide instructions to each of the first and the second motors, wherein the instructions cause one or more of the first and the second motors to turn or apply a braking function to one or more of the main reel and the pinch rollers.

5. The winch system of claim 4, further comprising:
a first encoder associated with the first motor, the first encoder operable to detect information about the payload line on the main reel; and
a second encoder associated with the second motor, the second encoder operable to detect information about the payload line between the first and the second pinch rollers.

6. The winch system of claim 5, wherein the at least one controller is configured to:
receive information from one or more of the first and the second encoders; and
based on the received information, provide instructions to one or more of the first or the second motors to adjust one or more of:
the speed of the payload line;
the acceleration of the payload line; and
the position of the payload line.

7. The winch system of claim 1, further comprising a locking mechanism operable to prevent the main reel from turning.

8. The winch system of claim 7, wherein the pinch rollers are configured to cut the payload line, wherein cutting the payload line comprises:
locking the main reel using the locking mechanism; and
increasing the speed of the second motor.

9. The winch system of claim 1, further comprising a servo motor operable to move a sliding shaft, wherein:
the sliding shaft comprises a guide hole through which the payload line is threaded; and
moving the sliding shaft causes the payload line to be distributed around the main reel in a substantially even manner.

10. A controller of a winch system for use in an aircraft, the controller operable to:
receive, from a sensor of the winch system, information about a payload line, the payload line comprising a first end and a second end;
provide instructions to at least one motor of the winch system based on the information received from the sensor in order to control a position of the second end of the payload line when the aircraft is airborne, wherein the winch system comprises:
a first motor operable to turn a main reel of the winch system in a first and a second direction, wherein turning the main reel in the first direction feeds the payload line out and turning the main reel in the second direction reels the payload line in; and
a second motor operable to turn a first pinch roller and a second pinch roller of the winch system, wherein turning the pinch rollers in the first direction feeds the payload line out, and turning the pinch rollers in the second direction reels the payload line in;
wherein the first and the second motors cooperate to feed out and reel in the payload line.

11. The controller of claim 10, wherein feeding the payload line out comprises:
the first motor applying a braking function; and
the second motor turning the pinch rollers in the first direction.

12. The controller of claim 10, wherein reeling in the payload line in comprises:
the first motor turning the main reel in the second direction; and
the second motor applying a braking function.

13. The controller of claim 10, further comprising:
receiving information about the payload line on the main reel from a first encoder associated with the first motor; and
receiving information about the payload line between the first and the second pinch rollers from a second encoder associated with the first and the second pinch rollers.

14. The controller of claim 13, wherein the instructions provided to one or more of the first and the second motors are based on the information received from one or more of the first and the second encoders.

15. The controller of claim 14, wherein the instructions to one or more of the first or the second motors comprise an instruction to adjust one or more of:
the speed of the payload line;
the acceleration of the payload line; and
the position of the payload line.

16. A method for a winch system for use in an aircraft, the method comprising:
receiving, from a sensor, information about a payload line, wherein the payload line comprises a first end and a second end, the first end coupled to a main reel of the winch system and the second end configured to couple to a payload;
receiving, from a controller, instructions to spool the payload line based on the information received from the sensor; and
operating, based on the instructions, one or more of a first motor of the winch system and a second motor of the winch system, wherein the one or more of the first motor and the second motor are operated in order to control a position of the second end of the payload line when the aircraft is airborne.

17. The method of claim 16, wherein the instructions to spool the payload line comprise instructions to reel in or reel out the payload line.

18. The method of claim 17, wherein reeling the payload line out comprises:
applying, by the first motor, a braking function; and
turning, by the second motor, the pinch rollers in the first direction.

19. The method of claim 17, wherein reeling in the payload line in comprises:
 turning, by the first motor, the main reel in the second direction; and
 applying, by the second motor, a braking function.

20. The method of claim 16, further comprising:
 receiving information about one or more of:
  the payload line on the main reel;
  the payload line between the first and the second pinch rollers;
 wherein the information about the payload line on the main reel is received from a first encoder associated with the first motor and the information about the payload line between the first and the second pinch rollers is received from a second encoder associated with the first and the second pinch rollers.

* * * * *